US012636743B2

(12) United States Patent
Machowski et al.

(10) Patent No.: US 12,636,743 B2
(45) Date of Patent: May 26, 2026

(54) SEPARATION TOOL AND METHOD FOR NOZZLE SEGMENTS OF GAS TURBINES

(71) Applicant: GE Vernova Infrastructure Technology LLC, New Castle County, DE (US)

(72) Inventors: Marek Machowski, Masovian (PL); Karol Tucki, Masovian (PL); Jacek Krzemiński, Masovian (PL)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 19/184,700

(22) Filed: Apr. 21, 2025

(65) Prior Publication Data

US 2025/0332670 A1     Oct. 30, 2025

(30) Foreign Application Priority Data

Apr. 30, 2024     (EP) ..................................... 24461565

(51) Int. Cl.
B23P 19/04          (2006.01)
F01D 9/02           (2006.01)
(Continued)

(52) U.S. Cl.
CPC .............. B23P 19/04 (2013.01); F01D 9/041 (2013.01); F05D 2230/70 (2013.01)

(58) Field of Classification Search
CPC ........ B23P 19/04; B23P 19/027; F01D 9/041; F01D 5/005; F01D 25/285; F01D 9/02;
(Continued)

(56) References Cited

U.S. PATENT DOCUMENTS 1,953,089 A * 4/1934 Small ................... B23P 15/006
                                                                   29/889.7
6,244,568 B1 * 6/2001 Patton ................... A62B 3/005
                                                                   254/93 H
(Continued)

FOREIGN PATENT DOCUMENTS

CN          206219116 U  *  6/2017
EP            3315734 A1 *  5/2018   ............... F01D 5/30
(Continued)

OTHER PUBLICATIONS

Extended European Search Report, EP 24461565.4, dated Aug. 5, 2024 (10 pp.).

*Primary Examiner* — Bayan Salone
(74) *Attorney, Agent, or Firm* — Eversheds Sutherland (US) LLP

(57)          ABSTRACT

A nozzle segment separation tool for use with a pair of airfoils of adjacent nozzle segments in a turbine is provided. The nozzle segment separation tool includes a pair of separation brackets, a movable separation bracket and a stationary separation bracket, and a hydraulic cylinder positioned between the pair of separation brackets. The movable separation bracket is positioned about a first airfoil of the pair of airfoils and the stationary separation bracket is positioned about a second airfoil of the pair of airfoils. The hydraulic cylinder pushes the movable separation bracket against the first airfoil until the stationary separation bracket pushes the second airfoil to separate from the first airfoil.

18 Claims, 7 Drawing Sheets

(51) Int. Cl.
    *F01D 9/04*            (2006.01)
    *F01D 19/02*        (2006.01)

(58) Field of Classification Search
    CPC ............. F05D 2230/70; F05D 2230/80; F05D
                  2260/406; F05D 2220/32; B25B 27/026
    See application file for complete search history.

(56)                    References Cited

U.S. PATENT DOCUMENTS

| | | | |
|---|---|---|---|
| 7,624,468 B2 * | 12/2009 | Reddy | A47L 13/255 |
| | | | 15/228 |
| 9,539,680 B2 * | 1/2017 | Hashimoto | F01D 25/28 |
| 9,816,398 B2 * | 11/2017 | Sajdak | F01D 25/246 |
| 2008/0016640 A1 | 1/2008 | Reddy et al. | |
| 2011/0140329 A1 * | 6/2011 | Mandody | B66F 3/36 |
| | | | 269/30 |
| 2013/0230392 A1 | 9/2013 | Hashimoto | |
| 2016/0160689 A1 | 6/2016 | Sajdak et al. | |

FOREIGN PATENT DOCUMENTS

| | | | | |
|---|---|---|---|---|
| EP | 3 315 734 B1 | 6/2019 | | |
| JP | 2022181354 A * | 12/2022 | ............. | F01D 25/28 |
| KR | 101155724 B1 * | 6/2012 | .......... | F01D 25/285 |
| WO | WO-2008070309 A2 * | 6/2008 | ............. | B63B 25/28 |

* cited by examiner

SEPARATION TOOL AND METHOD FOR NOZZLE SEGMENTS OF GAS TURBINES

CROSS-REFERENCE TO RELATED APPLICATION

This application claims priority pursuant to 35 U.S.C. 119(a) to European Patent Application No. 24461565.4, filed Apr. 30, 2024, which application is incorporated herein by reference in its entirety.

TECHNICAL FIELD

This invention relates generally to gas turbine engines and more particularly relates to a separation tool used to separate adjacent nozzle segments in preparation for removing the nozzles from a casing of the turbine for repair or replacement.

BACKGROUND

A gas turbine engine conventionally includes a compressor for compressing ambient air and a combustor for mixing the flow of air with a flow of fuel to generate hot combustion gases. A turbine receives the flow of hot combustion gases and extracts energy therefrom for powering the compressor and for producing output power for an external load such as an electrical generator and the like. The turbine components such as the turbine nozzles and blades positioned along the hot gas path are subject to high combustion temperatures and pressures as well as different types of dynamic forces. Given such, these hot gas path components may be replaced and/or refurbished on a periodic basis to ensure efficient and safe performance.

Removal of a hot gas component such as a nozzle and the like may be difficult and time consuming. Each stage of the nozzles typically may be formed in segments and placed circumferentially end-to-end to form a continuous ring about the casing of the turbine section. The high temperature and high-pressure environment may cause the nozzles to stick together and/or to be seized together in the supporting structure. Moreover, the small clearances in the turbine section provide very little space to access the nozzles and the other components therein much less sufficient space to apply any type of force to separate the nozzles prior to removal.

SUMMARY

This invention thus provides a nozzle segment separation tool for use with a pair of airfoils of adjacent nozzle segments in a turbine. The nozzle segment separation tool includes a pair of separation brackets, a movable separation bracket and a stationary separation bracket, and a hydraulic cylinder positioned between the pair of separation brackets. The movable separation bracket is positioned about a first airfoil of the pair of airfoils and the stationary separation bracket is positioned about a second airfoil of the pair of airfoils. The hydraulic cylinder pushes the movable separation bracket against the first airfoil until the stationary separation bracket pushes the second airfoil to separate from the first airfoil.

This invention further provides a method of separating a pair of adjacent nozzles in the casing of a turbine. The method may include the steps of sliding a nozzle segment separation tool about the pair of airfoils, positioning a movable separation bracket of the nozzle segment separation tool about a first airfoil of the pair of airfoils, positioning a stationary separation bracket of the nozzle segment separation tool about a second airfoil of the pair of airfoils, and pushing the movable separation bracket against the first airfoil by a hydraulic cylinder until the stationary separation bracket pushes the second airfoil to separate from the first airfoil.

This invention further may provide a nozzle segment separation tool for use with a pair of airfoils of adjacent nozzle segments in a turbine. The nozzle segment separation tool includes a pair of separation brackets, a movable separation bracket and a stationary separation bracket, and a hydraulic cylinder positioned between the pair of separation brackets. The stationary separation bracket is attached to the hydraulic cylinder and includes a contoured shape. The movable separation bracket is positioned about a first airfoil of the pair of airfoils and the stationary separation bracket is positioned about a second airfoil of the pair of airfoils. The hydraulic cylinder pushes the movable separation bracket against the first airfoil until the stationary separation bracket pushes the second airfoil to separate from the first airfoil.

These and other features and improvements of this invention will become apparent to one of ordinary skill in the art upon review of the following detailed description when taken in conjunction with the several drawings and the appended claims.

DETAILED DESCRIPTION

Figure 1:
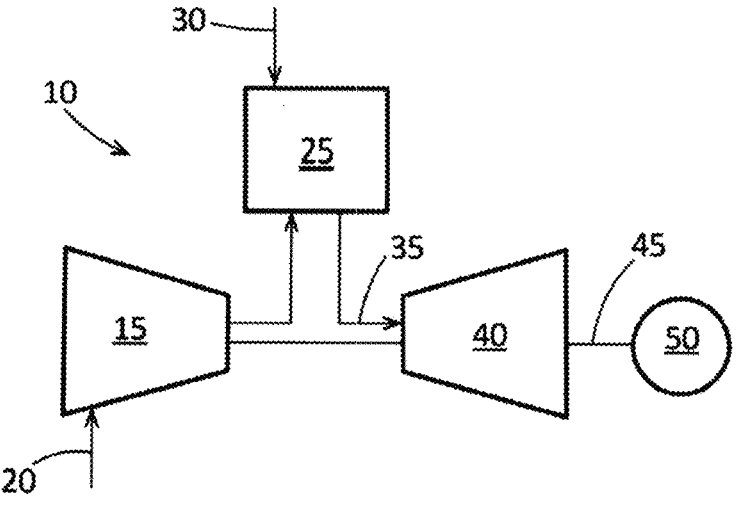
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of the combustor cans 25 positioned in a circumferential array and the like. Alternatively, the combustor 25 may be an annular combustor. The flow of the combustion gases 35 is in turn delivered to a turbine 40. The flow of the combustion gases 35 drives the turbine 40 to produce mechanical work. The mechanical work produced in the turbine 40 drives the compressor 15 and an external load 50 such as an electrical generator and the like via a rotor shaft 45.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
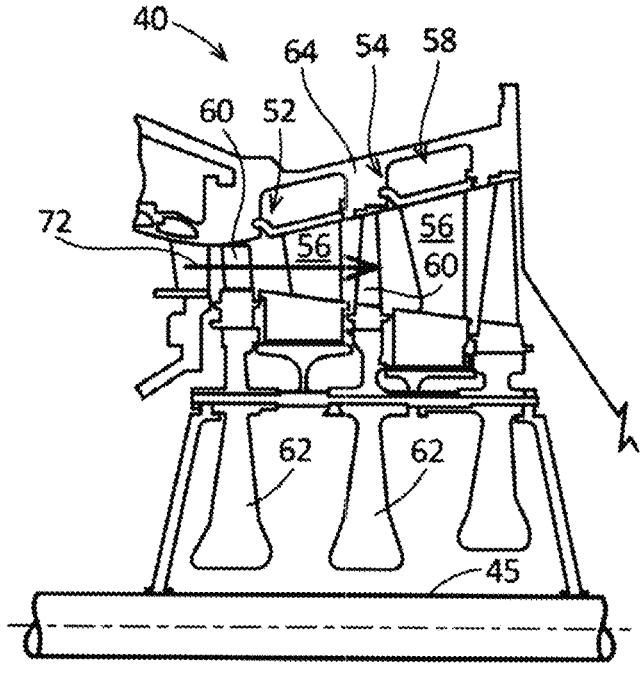
FIG. 2 is a schematic diagram of a number of stages positioned within a casing of a turbine.

FIG. 2 is a partial sectional view of the turbine 40. The turbine 40 includes a number of stages 52. Generally described, each stage 52 of the turbine 40 includes a stationary row 54 of nozzles 56 and a rotating row 58 of turbine blades 60. In this example, three stages 52 are shown, a first stage, a second stage, and a third stage. Any number of stages 52 may be used herein. The turbine blades 60 in each row 58 are spaced circumferentially about, and extend radially outward from, a rotor disk 62. Each rotor disk 62 is coupled to the rotor shaft 45. A turbine casing 64 extends circumferentially about the nozzles 56. The nozzles 56 are each coupled to the turbine casing 64 and each nozzle 56 extends radially inward from the turbine casing 64 towards the rotor shaft 45. Specifically, as will be described in more detail below, the nozzles 56 may be arranged in a number of segments 66 and may be attached to the turbine casing 64 via a number of shroud grooves in a number of shrouds. A hot combustion gas path 72 may be defined between the turbine casing 64 and each rotor disk 62.

Figures 3, 4:
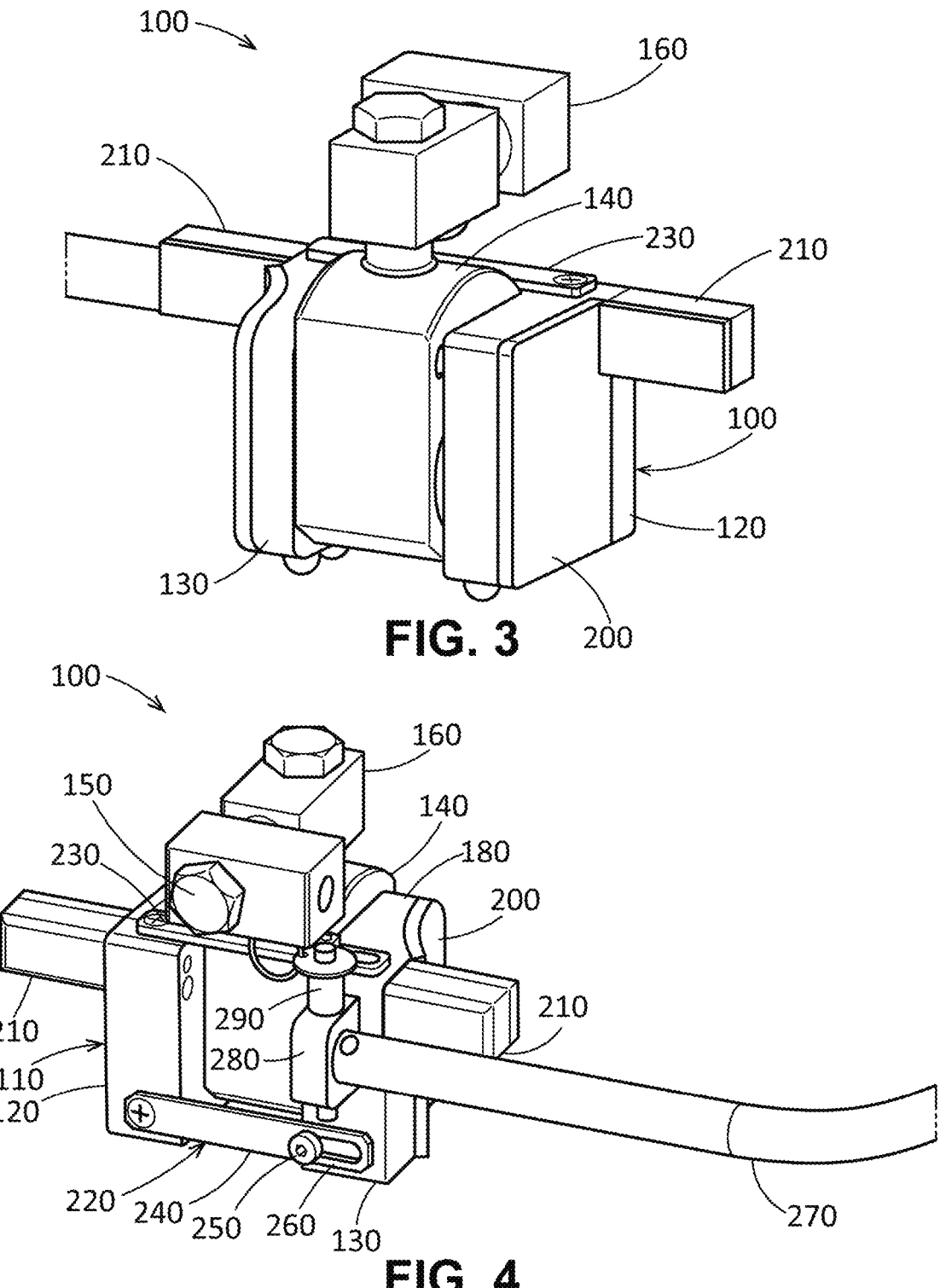
FIG. 3 is a front perspective view of a nozzle segment separation tool as may be described herein.
FIG. 4 is a rear perspective view of the nozzle segment separation tool of FIG. 3.
Figure 5:
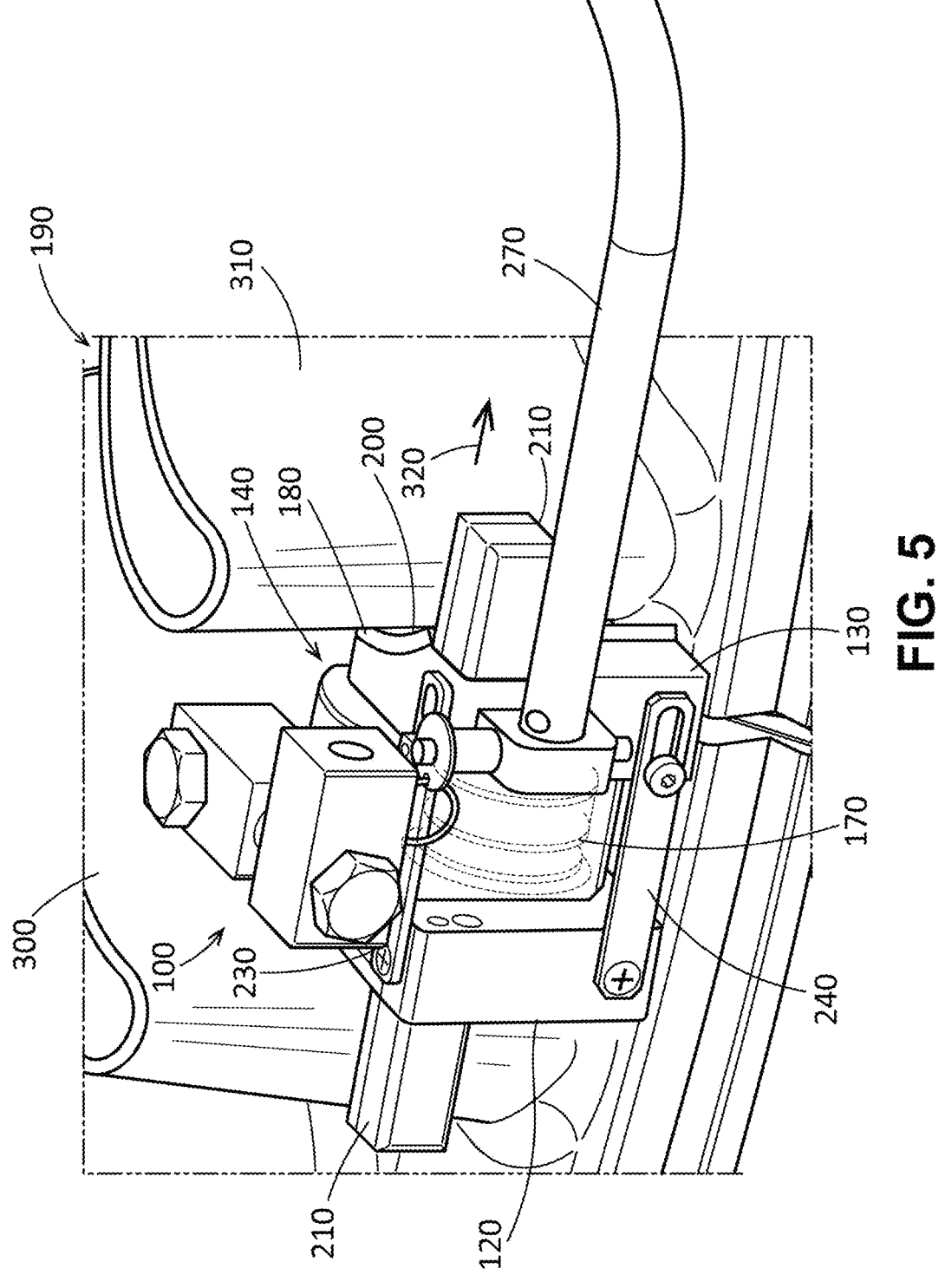
FIG. 5 is a partial front sectional view of the nozzle segment separation tool of FIG. 3 positioned between a pair of airfoils.
Figure 6:
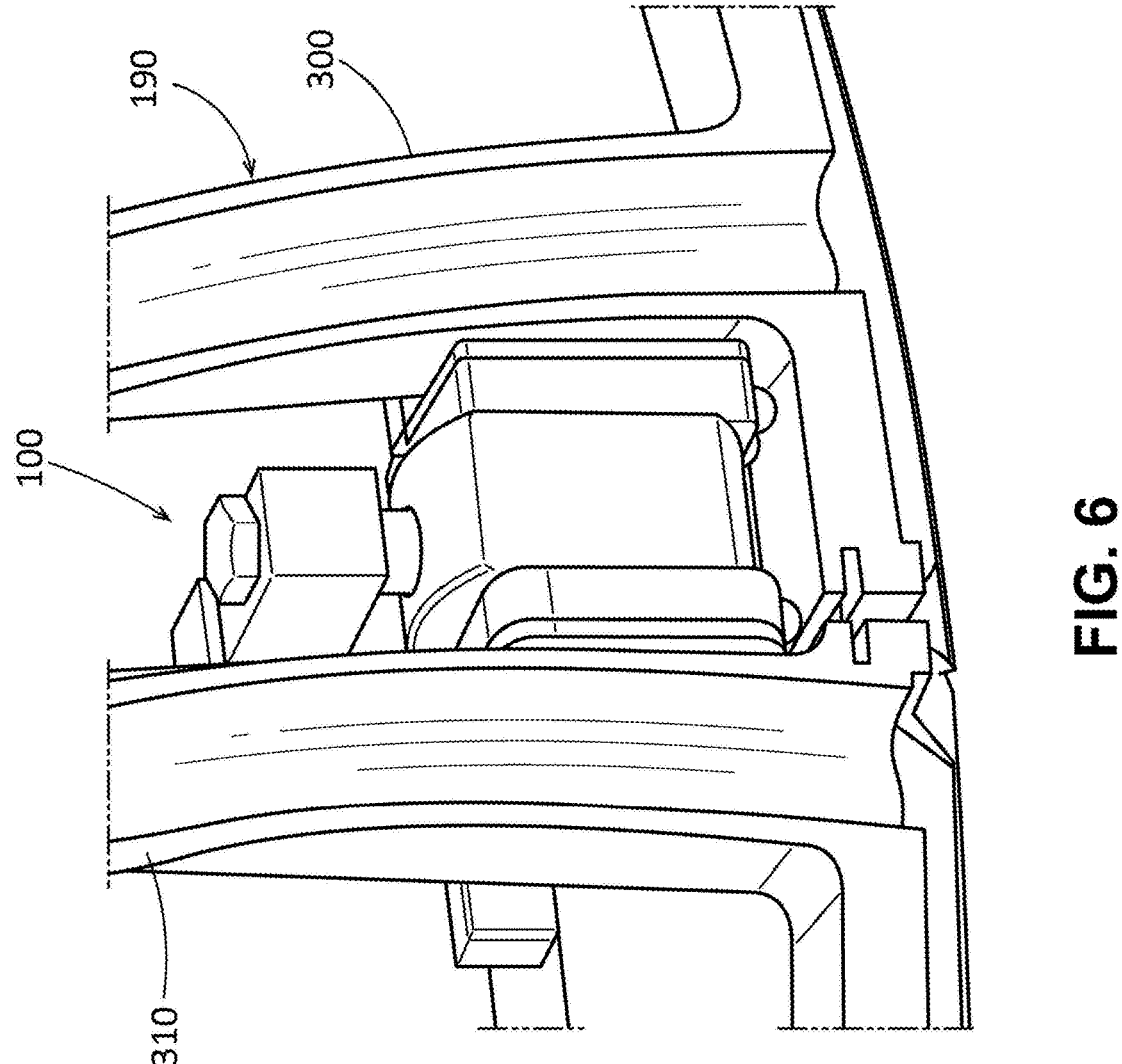
FIG. 6 is a partial rear sectional view of the nozzle segment separation tool of FIG. 3 positioned between a pair of airfoils.
Figure 7:
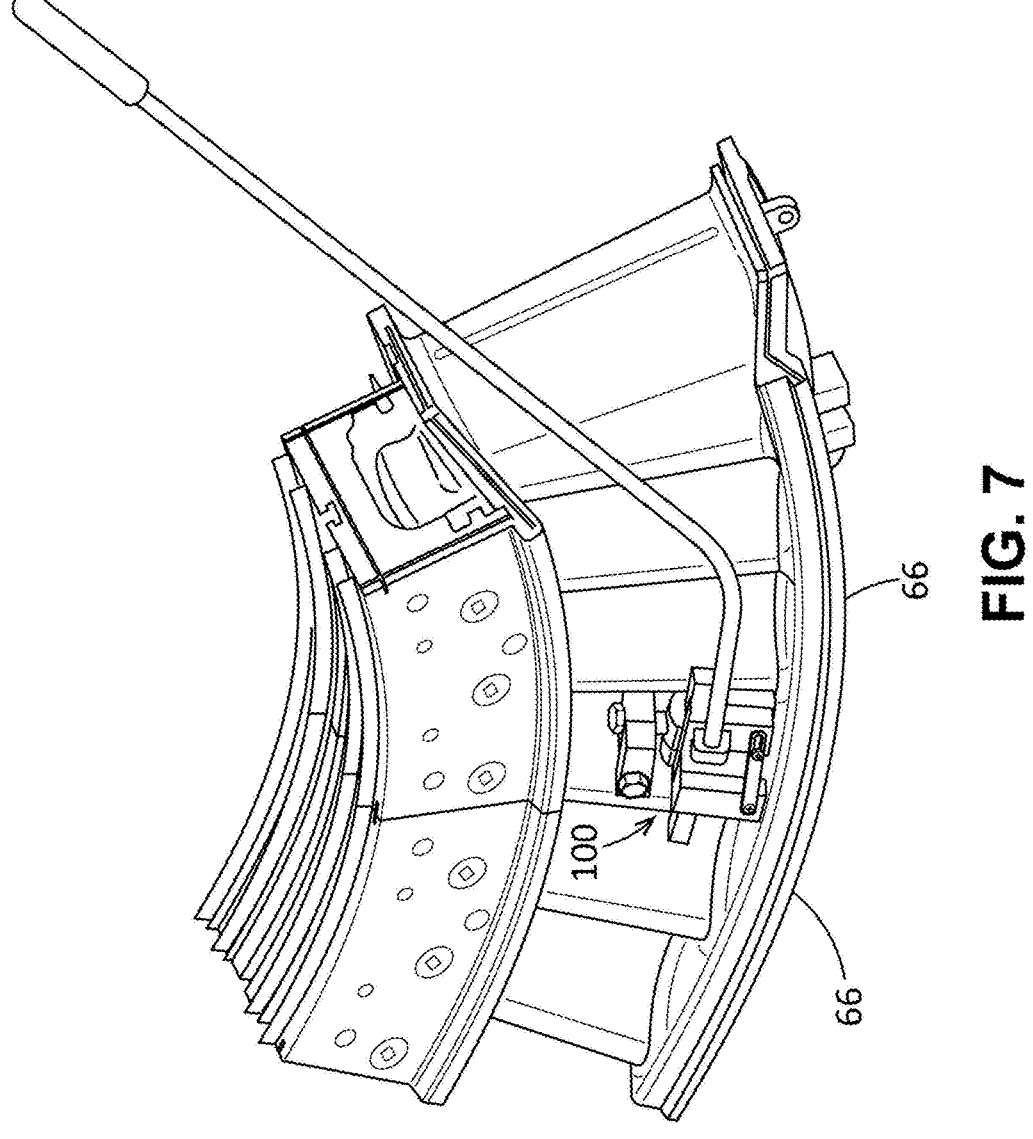
FIG. 7 is a perspective view of the nozzle segment separation tool of FIG. 3 positioned between nozzle segments.
Figure 8:
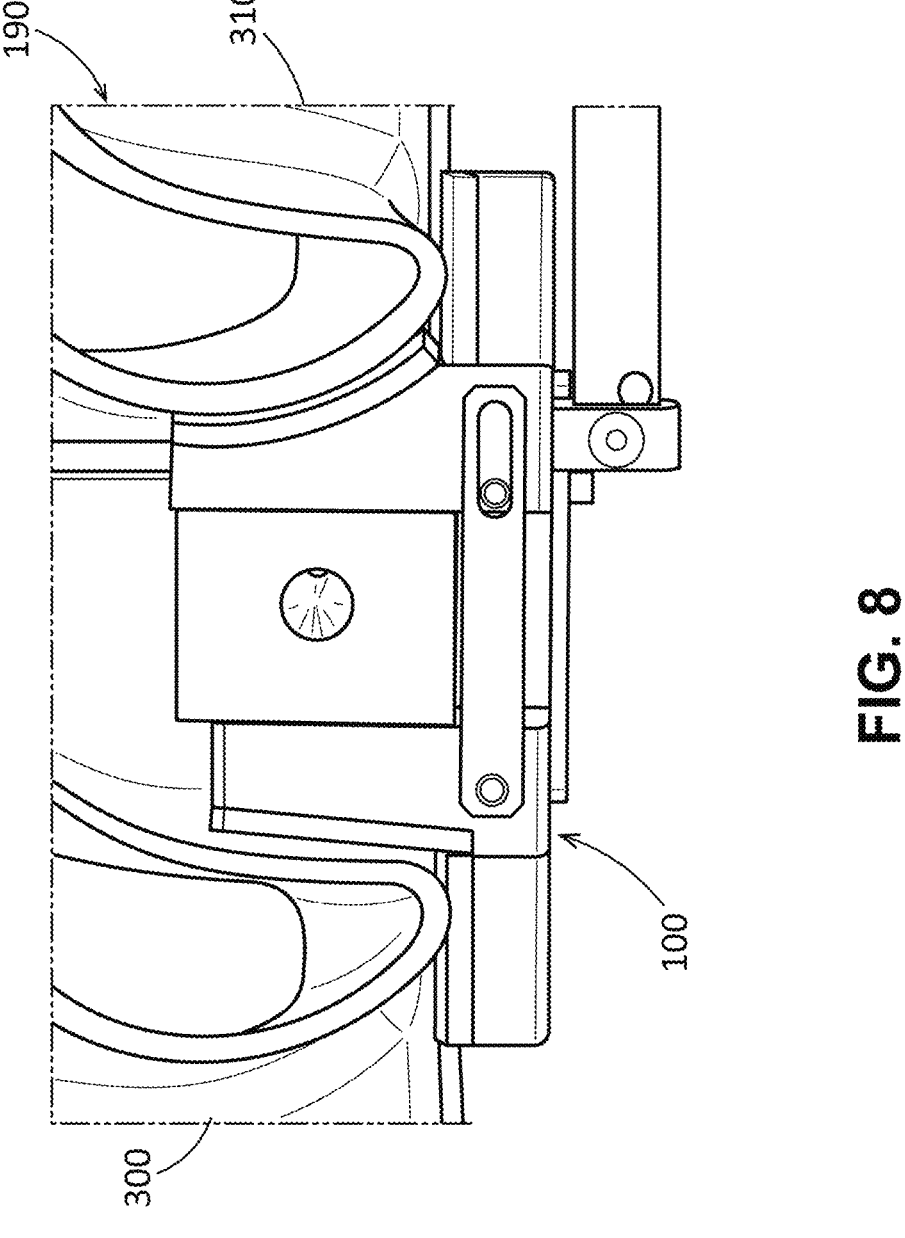
FIG. 8 is a top plan view of the nozzle segment separation tool of FIG. 3 positioned between a pair of airfoils; and, FIG. 9 is a side plan view of the nozzle segment separation tool of FIG. 3 positioned about a nozzle segment.
Figure 9:
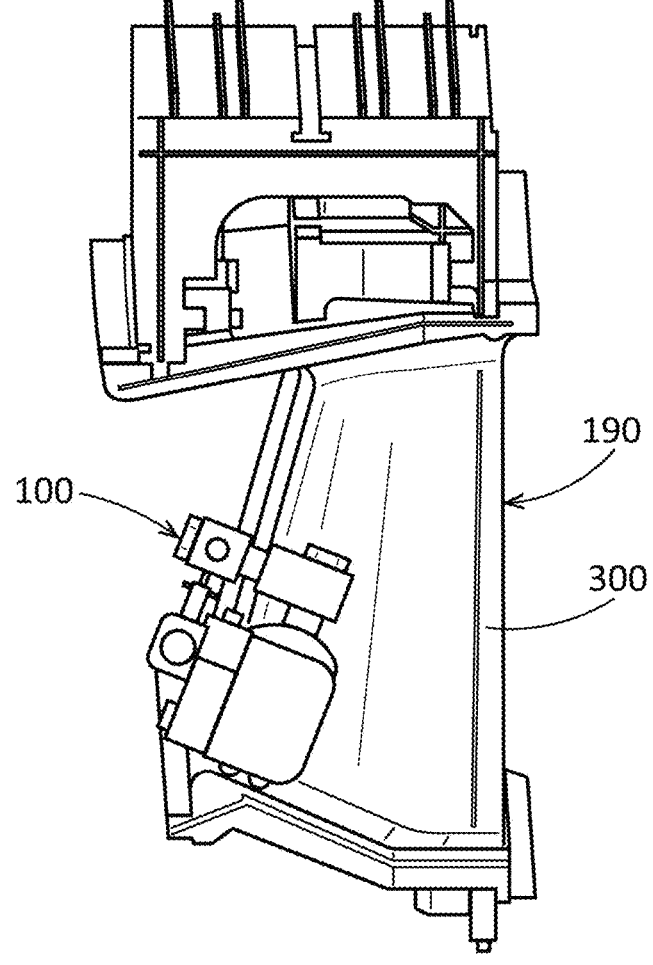

FIGS. 3-5 show an example of a nozzle segment separation tool 100 as may be described herein. The nozzle segment separation tool 100 may include a pair of separation brackets 110. In this case, a movable separation bracket 120 and a stationary separation bracket 130. The separation brackets 110 may be made of any substantially rigid material such as stainless steel and the like. Positioned between the separation brackets 110 and attached thereto may be a hydraulic cylinder 140. The hydraulic cylinder 140 may be of conventional design. Specifically, the hydraulic cylinder 140 may include a hydraulic fluid port 150 positioned within a hydraulic swivel hoist 160 and an internal piston 170. The hydraulic cylinder 140 may have a single stroke or a double stroke design. An exemplary hydraulic cylinder may be a five-ton capacity hydraulic cylinder sold by ENERPAC® of Milwaukee, Wisconsin. Other types of hydraulic cylinders, other types of capacities, and other types of push or pull mechanisms may be used herein. For example, different types of jacks, screws, and the like may be used herein. The hydraulic swivel hoist 160 may rotate through any desired angle of rotation. Other components and other configurations may be used herein.

At least the stationary separation bracket 130 of the nozzle segment separation tool 100 may have a contoured shape 180. The contoured shape 180 of the stationary separation bracket 130 may be complimentary to the shape of an intended airfoil 190. The movable separation bracket 120 may be similarly contoured. Separation brackets 110 with different types of contoured shapes 180 may be used herein to accommodate different types and shapes of airfoils 190. Each of the separation brackets 110 may have a shock absorbing layer 200 thereon. The shock absorbing layer 200 may be any type of viscoelastic materials such as rubber, polymerics, and the like. Each of the separation brackets 110 also may have a bumper 210 extending laterally therefrom. The bumpers 210 may be any type of substantially rigid material and may have a shock absorbing layer 200 thereon. The bumpers 210 assist in guiding the separation brackets 110 into place about the airfoils 190 and maintain the separation brackets 110 in place once operation has begun. Other components and other configurations may be used herein.

The stationary separation bracket 130 of the nozzle segment separation tool 100 may be bolted or otherwise attached to the hydraulic cylinder 140. The separation brackets 110 also may be attached to each other by a pair of safety slides 220. In this case, a top safety slide 230 and a front safety slide 240. Each safety slide 220 may be fixedly attached to the movable separation bracket 120 and slidably attached to the stationary separation bracket 130 via a roller 250 positioned within a slot 260. The safety slides 220 limit the length of travel of the separation brackets 110 if the nozzle segment separation tool 100 becomes disengaged from the airfoils 190. Brackets, cables, and the like also may be used. Other components and other configurations may be used herein.

The nozzle segment separation tool 100 may have a tool maneuvering rod 270 attached thereto. Specifically, the tool maneuvering rod 270 may be attached to the stationary separation bracket 130 or elsewhere via a quick release coupling 280 with a quick release pin 290. Other types of attachment mechanisms may be used herein. The tool maneuvering rod 270 may have any suitable size, shape, and length. Other types of maneuvering devices and connection devices may be used herein. Other components and other configurations may be used herein.

In use as is shown in FIGS. 5-9, the nozzle segment separation tool 100 may be inserted between the airfoils 190 of adjacent nozzle segments 66. Specifically, the nozzle segments separation tool 100 may be maneuvered into place via the tool maneuvering rod 270 or otherwise between a first airfoil 300 and a second airfoil 310. The movable separation bracket 120 contacts the first airfoil 300 and the stationary separation bracket 130 contacts the second airfoil 310. The bumpers 210 assist in correctly orienting the separation brackets 110 into position. The hydraulic cylinder 140 may be activated and may push the movable separation bracket 120 against the first airfoil 300. The hydraulic cylinder 140 continues pushing such that the stationary separation bracket 130 contacts the second airfoil 310. The nozzle segment separation tool 100 thus pushes the second airfoil 310 in the direction of travel 320 until the airfoils 190 and the nozzle segments 66 are separated. The hydraulic cylinder 140 then may be disengaged. The nozzle segment separation tool 100 then may be removed and/or repositioned. Once separated, the nozzle segments 66 may be removed in ordinary fashion.

The nozzle segment separation tool 100 thus allows quick and easy separation of the nozzle segments 66. Significantly, the nozzle segment separation tool 100 may separate the nozzle segments 66 without requiring time-consuming disassembly of the turbine 40, i.e., without requiring the removal of the rotor 45 and the like. The nozzle segment separation tool 100 thus reduces the required labor time and reduces the overall outage time of the gas turbine engine 10.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of this invention are provided by the subject matter of the following clauses:

1. A nozzle segment separation tool for use with a pair of airfoils of adjacent nozzle segments in a turbine, comprising: a pair of separation brackets; wherein the pair of separation brackets comprises a movable separation bracket and a stationary separation bracket; and a hydraulic cylinder positioned between the pair of separation brackets; wherein the movable separation bracket is positioned about a first airfoil of the pair of airfoils and the stationary separation bracket is positioned about a second airfoil of the pair of airfoils; and wherein the hydraulic cylinder pushes the movable separation bracket against the first airfoil until the stationary separation bracket pushes the second airfoil to separate from the first airfoil.

2. The nozzle segment separation tool of any preceding clause, wherein the hydraulic cylinder comprises an internal piston.

3. The nozzle segment separation tool of any preceding clause, wherein the hydraulic cylinder comprises a hydraulic fluid port positioned within a hydraulic swivel hoist.

4. The nozzle segment separation tool of any preceding clause, wherein one or both of the pair of separation brackets comprise a contoured shape.

5. The nozzle segment separation tool of any preceding clause, wherein each of the pair of separation brackets comprises a shock absorbing layer.

6. The nozzle segment separation tool of any preceding clause, wherein each of the pair of separation brackets comprises a bumper.

7. The nozzle segment separation tool of any preceding clause, wherein the bumper comprises a shock absorbing layer.

8. The nozzle segment separation tool of any preceding clause, further comprising a safety slide positioned between the pair of separation brackets.

9. The nozzle segment separation tool of any preceding clause, wherein the safety slide is fixedly attached to the movable separation bracket.

10. The nozzle segment separation tool of any preceding clause, wherein the safety slide is slidably attached to the stationary separation bracket via a roller and a slot.

11. The nozzle segment separation tool of any preceding clause, further comprising a plurality of safety slides.

12. The nozzle segment separation tool of any preceding clause, further comprising a tool maneuvering rod.

13. The nozzle segment separation tool of any preceding clause, wherein the tool maneuvering rod is attached to the stationary separation bracket via a quick release coupling.

14. The nozzle segment separation tool of any preceding clause, wherein the stationary separation bracket is bolted to the hydraulic cylinder.

15. A method of separating a pair of airfoils of adjacent nozzle segments in a turbine, comprising: sliding a nozzle segment separation tool about the pair of airfoils; positioning a movable separation bracket of the nozzle segment separation tool about a first airfoil of the pair of airfoils; positioning a stationary separation bracket of the nozzle segment separation tool about a second airfoil of the pair of airfoils; and pushing the movable separation bracket against the first airfoil by a hydraulic cylinder until the stationary separation bracket pushes the second airfoil to separate from the first airfoil.

16. A nozzle segment separation tool for use with a pair of airfoils of adjacent nozzle segments in a turbine, comprising: a pair of separation brackets; wherein the pair of separation brackets comprises a movable separation bracket and a stationary separation bracket; and a hydraulic cylinder positioned between the pair of separation brackets; wherein the stationary separation bracket is attached to the hydraulic cylinder and comprises a contoured shape; wherein the movable separation bracket is positioned about a first airfoil of the pair of airfoils and the stationary separation bracket is positioned about a second airfoil of the pair of airfoils; and wherein the hydraulic cylinder pushes the movable separation bracket against the first airfoil until the stationary separation bracket pushes the second airfoil to separate from the first airfoil.

17. The nozzle segment separation tool of any preceding clause, wherein the hydraulic cylinder comprises a hydraulic swivel hoist.

18. The nozzle segment separation tool of any preceding clause, wherein each of the pair of separation brackets comprises a shock absorbing layer and a bumper.

19. The nozzle segment separation tool of any preceding clause, further comprising a safety slide positioned between the pair of separation brackets.

20. The nozzle segment separation tool of any preceding clause, further comprising a tool maneuvering rod attached to the stationary separation bracket.

LIST OF REFERENCES

10 gas turbine engine
15 compressor
20 flow of air
25 combustor
30 flow of fuel
35 flow of combustion gases
40 turbine
45 shaft
50 generator
52 stages
54 stationary row
56 nozzles
58 rotating row
60 turbine blades
62 rotor disc
64 casing
66 segments
68 grooves
70 shrouds
72 combustion path
100 nozzle segment separation tool
110 separation brackets
120 movable separation bracket
130 stationary separation bracket
140 hydraulic cylinder
150 hydraulic fluid port
160 hydraulic swivel hoist
170 piston 180 contoured shape
190 airfoil
200 shock absorbing layer
210 bumper
220 safety slides
230 top safety slide
240 front safety slide
250 roller
260 slot
270 tool maneuvering rod
280 quick release coupling
290 quick release pin
300 first airfoil
310 second airfoil
320 direction of travel

What is claimed is:

1. A nozzle segment separation tool for use with a pair of airfoils of adjacent nozzle segments in a turbine, comprising:

a pair of separation brackets;

wherein the pair of separation brackets comprises a movable separation bracket and a stationary separation bracket;

a hydraulic cylinder positioned between the pair of separation brackets; and a safety slide positioned between the pair of separation brackets wherein the movable separation bracket is positioned about a first airfoil of the pair of airfoils and the stationary separation bracket is positioned about a second airfoil of the pair of airfoils; and, wherein the hydraulic cylinder pushes the movable separation bracket against the first airfoil until the stationary separation bracket pushes the second airfoil to separate from the first airfoil.

2. The nozzle segment separation tool of claim 1, wherein the hydraulic cylinder comprises an internal piston.

3. The nozzle segment separation tool of claim 1, wherein the hydraulic cylinder comprises a hydraulic fluid port positioned within a hydraulic swivel hoist.

4. The nozzle segment separation tool of claim 1, wherein one or both of the pair of separation brackets comprise a contoured shape.

5. The nozzle segment separation tool of claim 1, wherein each of the pair of separation brackets comprises a shock absorbing layer.

6. The nozzle segment separation tool of claim 1, wherein each of the pair of separation brackets comprises a bumper.

7. The nozzle segment separation tool of claim 6, wherein the bumper comprises a shock absorbing layer.

8. The nozzle segment separation tool of claim 1, wherein the safety slide is fixedly attached to the movable separation bracket.

9. The nozzle segment separation tool of claim 8, wherein the safety slide is slidably attached to the stationary separation bracket via a roller and a slot.

10. The nozzle segment separation tool of claim 1, further comprising a plurality of safety slides.

11. The nozzle segment separation tool of claim 1, further comprising a tool maneuvering rod.

12. The nozzle segment separation tool of claim 11, wherein the tool maneuvering rod is attached to the stationary separation bracket via a quick release coupling.

13. The nozzle segment separation tool of claim 1, wherein the stationary separation bracket is bolted to the hydraulic cylinder.

14. A nozzle segment separation tool for use with a pair of airfoils of adjacent nozzle segments in a turbine, comprising:

a pair of separation brackets;

wherein the pair of separation brackets comprises a movable separation bracket and a stationary separation bracket; and, a hydraulic cylinder positioned between the pair of separation brackets;

wherein the stationary separation bracket is attached to the hydraulic cylinder and comprises a curved contoured shape;

wherein the movable separation bracket is positioned about a first airfoil of the pair of airfoils and the stationary separation bracket is positioned about a second airfoil of the pair of airfoils; and, wherein the hydraulic cylinder pushes the movable separation bracket against the first airfoil until the stationary separation bracket pushes the second airfoil to separate from the first airfoil.

15. The nozzle segment separation tool of claim 14, wherein the hydraulic cylinder comprises a hydraulic swivel hoist.

16. The nozzle segment separation tool of claim 14, wherein each of the pair of separation brackets comprises a shock absorbing layer and a bumper.

17. The nozzle segment separation tool of claim 14, further comprising a safety slide positioned between the pair of separation brackets.

18. The nozzle segment separation tool of claim 14, further comprising a tool maneuvering rod attached to the stationary separation bracket.

* * * * *